Jan. 25, 1949.  A. RAPPL  2,460,147

WINDSHIELD CLEANER

Filed March 23, 1945

INVENTOR
ANTON RAPPL
BY
Bean, Brooks, Buckley & Bean.  ATTORNEYS

Patented Jan. 25, 1949

2,460,147

UNITED STATES PATENT OFFICE 2,460,147

WINDSHIELD CLEANER

Anton Rappl, Eggertsville, N. Y., assignor to Trico Products Corporation, Buffalo, N. Y.

Application March 23, 1945, Serial No. 584,267

6 Claims. (Cl. 287—53)

This invention relates to the windshield cleaner art and more particularly to the mounting of the wiper arm on its actuating shaft. Ordinarily, the wiper arm is provided with a mounting section and a pivotally connected wiper carrying section, the mounting section being formed with a socket to fit over the outer end of the actuating shaft. It has heretofore been proposed to detachably mount the arm on the shaft by means of an arm carried latch engaging the shaft. The object of the present invention is to provide an improved wiper arm of this type which is economical in construction and practical in design and arrangement by which the arm is securely fastened to the shaft against accidental displacement and loss.

Figure 4:
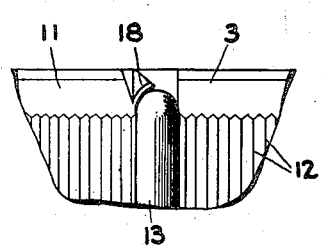
Fig. 4 is an enlarged detail view in fragment illustrating the manner of retaining the latch in position.
Figure 1:
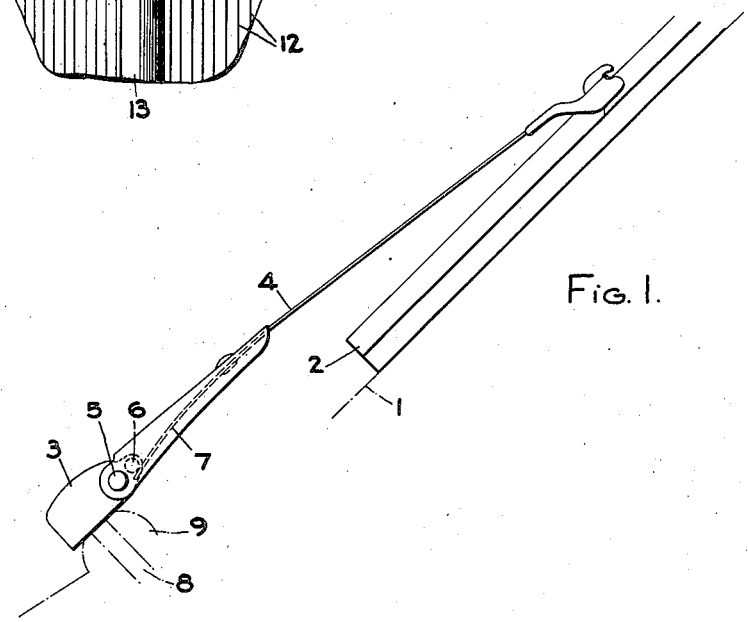
Fig. 1 shows in elevation the improved arm in its operative relationship to a windshield and an associated wiper.

Referring more particularly to the drawings, the numeral 1 designates the windshield surface on which the wiper 2 is oscillated by means of its arm herein illustrated as having a die-cast mounting section 3 and a wiper carrying section 4 pivotally joined to the section 3 by a pin 5. The mounting section carries a bearing 6 upon which rests the free end of a spring leaf 7 for providing the pressure necessary in the wiping contact of the wiper 2 on the windshield surface. The wiper operating shaft 8 is journaled in a housing 9 and provided with a preferably cylindrical and enlarged head 10 adapted to be received within a socket 11 formed in the mounting section 3. If desired, the head and socket may be provided with an inter-engaging knurled or ribbed formation 12.

Figure 3:
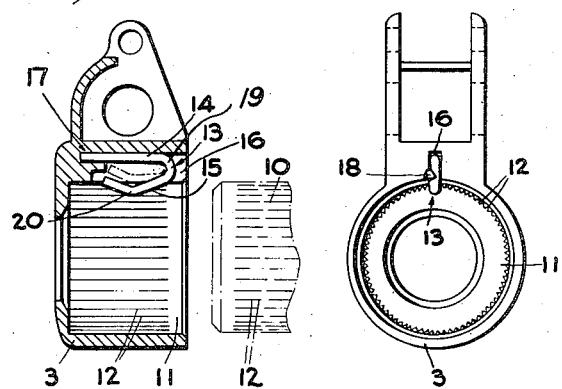
Fig. 3 is a cross sectional view through the mounting section.
Figure 2:
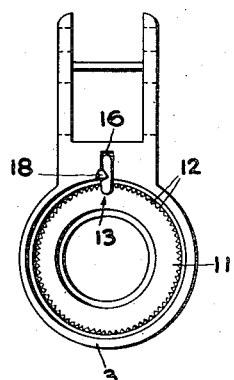
Fig. 2 is a rear elevation of the mounting section of the arm.

For securing the arm against accidental displacement from its actuating shaft there is provided a latch 13 in the form of a spring wire body bent into substantially U-form to form a mounting leg or shank 14 and a shaft engaging leg 15. The mounting section 3 is shown formed with a narrow chamber 16 opening through the side of the socket 11 and into this slot-like chamber is disposed the latch 13. The chamber opens with the socket as a radial extension thereof through the back face of the mounting section 3 to facilitate the placement of the latch. The bottom of the chamber is formed with a recess 17 in which the free end of the longer leg 14 is anchored. After placement in the chamber the latch is retained against accidental displacement by an overhanging burr 18 which is struck out from the chamber wall, as is depicted more clearly in Fig. 4. This burr may easily be displaced from the chamber wall when the mounting section is die-cast from a soft metal alloy, and by reason of its location wherein it overhangs the bight portion 19 the wire member is obstructed against withdrawing from the recess 17. The shaft engaging leg 15 is formed with an intermediate bend to provide a friction shoe or active portion 20 for bearing upon the ribbed periphery of the shaft head 10. This shaft engaging shoe or active portion normally extends into the socket 11 and in a rearward direction so as to permit ready placement of the arm over the shaft head 10 but necessitating an added effort to displace the arm from the shaft. The contour of the friction shoe may be shaped to bite into the head 10 more or less as desired. The free end of the shaft engaging leg 15 is turned back into the chamber 16, as shown in Fig. 3 so as to be guided by the latter during its yielding movement.

In assembling the latch on the mounting section the generally U-shaped wire body is inverted and dropped into the narrow chamber 16 with the mounting shank 14 fitting the recess 17 and thereafter the chamber wall is deformed, as by shaping the keeper lug or burr 18 above the bight 19, for retaining the latch against displacement. This firmly anchors the latch while enabling the shorter shaft engaging leg 15 to resiliently yield with its friction shoe 20 when mounting the arm.

The foregoing description is by way of disclosure of the invention and not in limitation thereof since the inventive principles are capable of assuming other physical embodiments without departing from the spirit of the invention and the appended claims.

What is claimed is:

1. A wiper arm comprising a die-cast section having one face formed with a shaft-receiving socket the side wall of which latter being provided with a multiplicity of ribs for interlockingly receiving the ribbed periphery of a shaft part, said section also formed with a narrow chamber opening into the socket through its side wall and between spaced ribs, the chamber opening as a radial continuation of the socket through such face, the bottom of the chamber having a latch anchoring recess, and a latch in the chamber having a mounting shank engaged in the recess and an active part yieldably extending into the socket to engage a shaft, the mounting shank extending from the recess into lateral supporting contact with the side wall of the chamber above the recess.

2. A wiper arm comprising a die-cast section having one face formed with a shaft-receiving socket the side wall of which latter being provided with a multiplicity of ribs for interlockingly receiving the ribbed periphery of a shaft part, said section also formed with a narrow chamber opening into the socket through its side wall and between spaced ribs, the chamber opening as a radial continuation of the socket through such face, the bottom of the chamber having a latch anchoring recess, and a substantially U-shaped wire latch inverted in the chamber with one leg engaged in the recess and its other leg bowed outwardly into the socket to constitute a resiliently yieldable shaft gripping shoe, the mounting shank extending from the recess into lateral supporting contact with the side wall of the chamber above the recess.

3. A wiper arm comprising a die-cast section having one face formed with a shaft-receiving socket the side wall of which latter being provided with a multiplicity of ribs for interlockingly receiving the ribbed periphery of a shaft part, said section also formed with a narrow chamber opening into the socket through its side wall and between spaced ribs, the chamber opening as a radial continuation of the socket through such face, the bottom of the chamber having a latch anchoring recess, and a substantially U-shaped wire latch inverted in the chamber with one leg engaged in the recess and having lateral bearing support against the side wall of the chamber above the recess and its other leg bowed outwardly into the socket to constitute a resiliently yieldable shaft gripping shoe, the chamber wall being deformed over the bight portion of the U-latch to hold said first leg in supporting contact with said side wall of the chamber.

4. A wiper arm comprising a die-cast section having one face formed with a shaft-receiving socket the side wall of which latter being provided with a multiplicity of ribs for interlockingly receiving the ribbed periphery of a shaft part, said section also formed with a narrow chamber opening into the socket through its side wall and between spaced ribs, the chamber opening as a radial continuation of the socket through such face, the bottom of the chamber having a latch anchoring recess, a substantially U-shaped wire latch inverted in the chamber with one leg engaged in the recess and having lateral bearing support against the side wall of the chamber above the recess and its other leg bowed outwardly into the socket to constitute a resiliently yieldable shaft gripping shoe, and means engaging said other leg to retain the latch in place with the first leg in such supporting contact with said side wall of the chamber.

5. A wiper arm having a shaft receiving socket formed with a side wall chamber both opening together through the rear face of the arm, a U-shaped spring wire latch arranged in inverted position within the chamber with one leg being deflected out into the socket and terminating free of the socket to frictionally bind upon an inserted shaft, the chamber wall being deformed over the bight of the U-latch to secure the latter in position.

6. A wiper arm having a shaft receiving socket formed with a side wall chamber and a U-shaped spring wire latch arranged in inverted position within the chamber with one leg being anchored therein and supported laterally by the side wall of the chamber, with the opposite leg being deflected outwardly into the socket for frictionally binding upon an inserted shaft, said deflected leg having a shaft engaging part arranged in opposition to that portion of the first leg which is laterally supported by said side wall of the chamber.

ANTON RAPPL.

REFERENCES CITED

The following references are of record in the file of this patent:

UNITED STATES PATENTS

| Number | Name | Date |
| --- | --- | --- |
| 2,154,537 | Stenberg | Apr. 18, 1939 |
| 2,220,346 | Mueller | Nov. 5, 1940 |
| 2,388,089 | Scinta | Oct. 30, 1945 |